April 5, 1966    D. TIJUNELIS    3,244,346
COLD-WORKING POLYSTYRENE FOAM CONTAINER TO
ENHANCE CUSHIONING
Filed June 26, 1963

INVENTOR
DONATAS TIJUNELIS

BY Mason, Porter, Diller & Stewart
ATTORNEYS

United States Patent Office 3,244,346
Patented Apr. 5, 1966

3,244,346
COLD-WORKING POLYSTYRENE FOAM CONTAINER TO ENHANCE CUSHIONING
Donatas Tijunelis, Chicago, Ill., assignor to Continental Can Company, Inc., New York, N.Y., a corporation of New York
Filed June 26, 1963, Ser. No. 290,859
7 Claims. (Cl. 229—2.5)

This invention relates to a novel method and apparatus for producing a foam plastic article, such as a container having an article-receiving compartment, and enhancing the shock-absorbing characteristics of the article-receiving compartment by subjecting an area thereof to a compressive force in excess of the compressive strength of the compartment to reduce the compression modulus of the area thereby forming a shock-absorbing compartment heretofore unprovided for in the prior art.

In the manufacture of complex containers, such as egg cartons for packaging a number of fragile items, it has heretofore been difficult and expensive to achieve a balance between structural stiffness and cushioning capacity or shock-absorbing capacity of the containers. To achieve this balance when a complex container is constructed from a single material, generally paperstock material, it has been possible to achieve a balance between structural stiffness and cushioning capacity only by extremely optimized container designs. Structural members of the complex containers are presently distributed to present their most yielding dimensions as a source of cushioning and their most rigid dimension for structurally reinforcing the containers. However, since paperstock and pulp material have little inherent cushioning qualities even the most optimizing container designs are generally incapable of producing complex containers having desired structural stiffness and cushioning capacity.

It has been found that an article formed from expandable foam plastic, such as polystyrene, may be rendered more resilient by subjecting the article to repeated compression forces. This resilience is attributable to a break-up of the rigid bead skin structure of the foam plastic article, by axial orientation of the foam plastic and, where the foam plastic article is a complex container such as an egg carton, a change from a highly angular to a more spherical geometry of the foam-cell. By compressing the foam plastic article only once the compression modulus of the foam material decreases and a structurally different, relatively resilient cushioning material is obtained. Applying this phenomena to a foam plastic container, such as an egg carton formed of expandable polystyrene, the individual egg cells have been rendered significantly more shock-absorbing in areas where additional cushioning is necessary or desirable.

By employing this technique, an egg carton is molded from foam plastic material to conform to an optimum design from a structural point of view. Thereafter the cushioning or shock-absorbing capacity of the egg carton is enhanced by transforming critical egg-supporting areas into a resilient, soft condition of a relatively low compression modulus by the application of a single compressive force against these areas. The individual egg cells are thus rendered significantly more shock-absorbing while at the same time the remainder of the egg carton remains structurally reinforced and relatively rigid.

An object of this invention is to produce a foam plastic container including a shock-absorbing article-receiving compartment with an area having a relatively low compression modulus and high resilience by molding a foam plastic container having an article-receiving compartment of a particular compressive strength and subjecting an area of the compartment to a compressive force in excess of the compressive strength of the compartment to reduce the compression modulus of the area thereby increasing the cushioning or shock-absorbing effect of this area without otherwise effecting the structural stiffness of the container as a whole.

Another object of this invention is to provide a novel method for producing a foam plastic egg carton including a plurality of egg-receiving cells having shock-absorbing areas by molding a polystyrene foam plastic egg carton of a particular compressive strength and subjecting areas in each of the egg-receiving cells to a compressive force in excess of the compressive strength of the polystyrene egg carton to reduce the compression modulus of each area thereby forming areas of relatively low compression moduli having high cushioning or shock-absorbing characteristics.

Another object of this invention is to provide a novel method of producing a polystyrene egg carton in the manner above-described wherein the compressive force exerted against each of the areas of the egg-receiving cells is provided by forceably inserting an egg against these areas in each egg-receiving cell.

Another object of this invention is to provide a novel mold apparatus, the mold apparatus including a pair of opposed hollow mold sections having opposed surface portions defining a mold cavity therebetween, guide means in one of the mold sections opening toward the other of the mold sections and a member guidably carried within the guide means for movement beyond a surface portion of the one mold section whereby relative movement between the pair of opposed mold sections after an article has been molded in the mold cavity subjects the article to a compressive force.

Still another object of this invention is to provide a novel mold apparatus of the type immediately above-described wherein the guide means is a tubular sleeve and the member is a hollow plunger reciprocably mounted within the tubular sleeve.

A further object of this invention is to provide a novel steam-chest mold of the type including a pair of opposed hollow mold sections having surface portions defining a mold cavity contoured to the general configuration of an egg carton, one of the mold sections including a tubular sleeve opening toward the other of the mold sections, a reciprocal, hollow plunger guidably carried within the tubular sleeve for movement beyond a surface of the one mold section, and means for placing the hollow plunger in fluid communication with the one hollow mold section through the tubular sleeve.

Another object of this invention is to provide a novel egg carton formed from a foam plastic, the egg carton having a plurality of egg-receiving cells, a shock-absorbing portion integrally formed from the material of the egg-receiving cells and each of the shock-absorbing portions having a compression modulus substantially less than the compression modulus of the foam plastic material forming the egg carton.

With the above, and other objects in view that will hereinafter appear, the nature of the invention will be more clearly understood by reference to the following detailed description, the appended claims and the several views illustrated in the accompanying drawings:

In the drawings:

FIGURE 1 is a vertical sectional view of an improved steam-chest mold, and illustrates a male and female mold section defining a cavity therebetween, a pair of reciprocal hollow plungers guidably mounted in the male mold section, by an associated tubular sleeve, and a pair of alignable apertures placing each of the hollow reciprocal plungers in fluid communication with an interior of the male mold section.

FIGURE 2 is a vertical sectional view of the steam-chest mold of FIGURE 1, and illustrates the male and female mold sections in a relatively retracted position, a foam plastic container carried by the female mold section and the pair of plungers reciprocated beyond cavity defining surface portions of the male mold section prior to the movement thereof toward the female mold section for subjecting selective areas of the foam to a compressive force.

FIGURE 3 is a fragmentary schematic view of an apparatus for subjecting selected areas of a foam plastic container to compressive forces by forceably inserting an egg against an area in each of a plurality of egg-receiving cells of the container, and illustrates a mechanism for reciprocating an arm carrying an egg prior to reciprocating the same forceably into an egg-receiving cell of the container.

Figure 4:
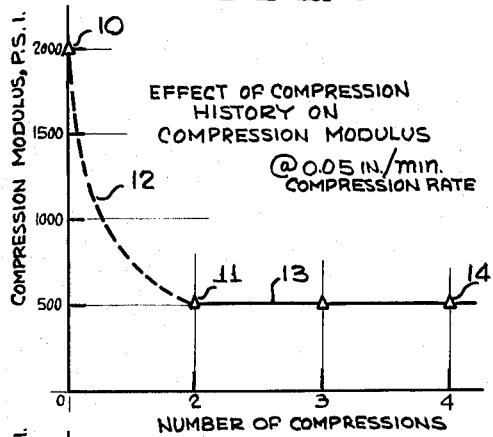
FIGURE 4 is a graph showing the change in the compression modulus of a foam plastic after a single compressive force has been applied against the foam plastic and the invariance of the foam plastic thereafter.
Figure 5:
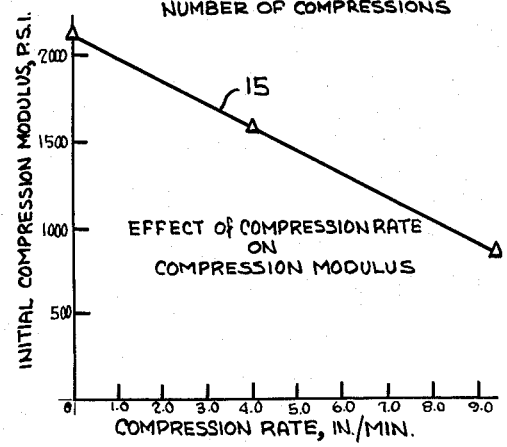
FIGURE 5 is a graph illustrating the effect of compression rate upon the compression modulus of a foam plastic material.

Referring to the drawings specifically, this invention will be best understood by first considering the graphs illustrated in FIGURES 4 and 5. FIGURE 4 illustrates the effect produced when a foam plastic material, such as expandable polystyrene, is subjected to repeated compressions at a compression rate of 0.05 inch per minute. The foam plastic material has an initial compression modulus of 2000 p.s.i. as is indicated by a point 10 on the graph of FIGURE 4. The application of a single compressive force against the foam material in excess of the compressive strength thereof causes a reduction of the compression modulus from 2000 p.s.i. at point 10 to a compression modulus of approximately 500 p.s.i. at point 11. A dotted line 12 between the points 10 and 11 graphically illustrates this reduction in the compression modulus of the foam plastic material. Thus, by compressing the foam plastic material only once, a structurally different material is obtained in the compressed areas. After a first compression, the foam plastic material becomes softer, and when the compression force does not exceed the elastic limit of the foam plastic material, the same is not plastically deformed. The reduction in the compression modulus of the foam plastic material renders the same significantly more shock-absorbing.

A solid line 13 between the points 11 and 14 in the graph of FIGURE 4 illustrates the invariance of the compression modulus of the foam plastic material after it has once been subjected to compressive forces beyond the compressive strength of the material. After the first compression of the foam plastic material subsequent compressions of the same magnitude in no way reduce the compression modulus. As used herein, the phrase "compression modulus" is used in the usual and conventionally accepted sense of the ratio of stress to strain which, for practical purposes, is calculated by multiplying the compressive load per unit of area of a sample by the ratio of the original length of the sample and the change in the length of the sample.

The graph illustrated in FIGURE 5 shows the effect of the compression rate in inches per minute on the compression modulus of expandable polystyrene foam. A line 15 indicates the increase in compression rates and the proportional decrease in the compression modulus of expandable polystyrene having an initial compression modulus of approximately 2000 p.s.i. Therefore, by varying the compression rate, a foam plastic material at an initial compression modulus which is known may be selectively subjected to compressive forces until a final desired compression modulus is obtained.

Figure 1:
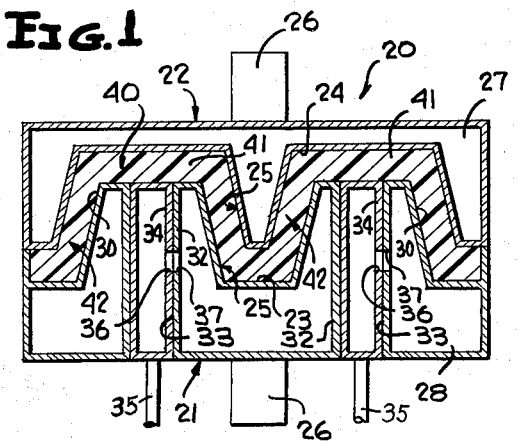
Figure 2:
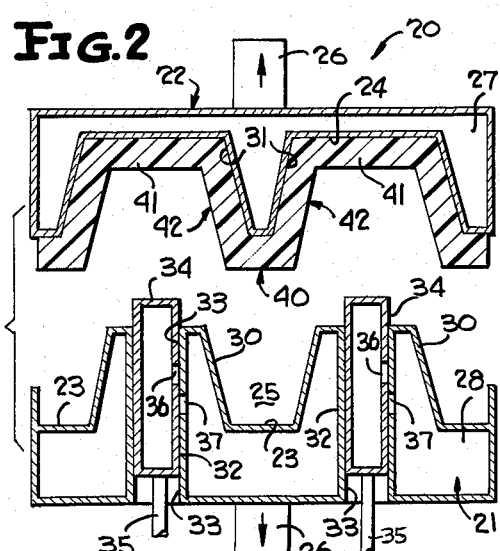

An apparatus for producing a foam plastic article and thereafter subjecting selective areas of the plastic article to compressive forces to reduce the compression modulus thereof is illustrated in FIGURES 1 and 2 of the drawings. The apparatus disclosed in FIGURES 1 and 2 is a steam-chest mold comprising a first or male mold section 21 and a second or female mold section 22. The mold sections 21 and 22 are arranged in axially opposed relationship and include respective opposing surfaces 23 and 24 defining therebetween a mold cavity 25. The mold cavity 25 is contoured to the general configuration of an egg carton having a plurality of egg receiving compartments or cells. An identical ram 26 is carried by each of the mold sections 21 and 22 for reciprocating these sections in a manner well known in the prior art. Each of the mold sections 21 and 22 includes respective chambers 27 and 28 into which steam is introduced in a manner well known in the prior art during a molding cycle of the steam-chest mold 20.

A pair of substantially frusto-conical upwardly projecting members 30 are each in alignment with a respective one of a pair of identical downwardly opening frusto-conical cavities 31. The frusto-conical members 30 and the frusto-conical cavities 31 cooperate to define egg-receiving cavity portions in the mold cavity 25.

An integral guide means or tubular sleeve 32 is axially arranged in each of the frusto-conical members 30 and has an axial opening 33 opening upwardly and outwardly toward a respective one of the frusto-conical cavities 31. An identical plunger 34 carrying a rod 35 is reciprocally guided in each of the tubular sleeves 32 by a conventional camming mechanism (not illustrated) urging the rods 35 upwardly and downwardly as viewed in FIGURES 1 and 2 of the drawings. Each of the plungers 34 is hollow and is provided with a radial aperture 36. Each of the radial apertures 36 is alignable with an associated radial aperture 37 in the tubular sleeves 32.

A container, such as an egg carton, is produced in the steam-chest mold 20 by first introducing a foam plastic such as polystyrene into the cavity 25 of the steam-chest mold 20, thereafter closing the mold sections 21 and 22 by reciprocating the rams 26 and introducing steam into the chambers 27 and 28 to expand the polystyrene to form an egg carton 40 of FIGURE 1. While the finished egg carton 40 is still in the steam chest-mold 20, the plungers 34 are reciprocated upwardly as viewed in FIGURE 1 of the drawings at a particular rate dependent upon the desired compression modulus of areas of the egg carton 40 against which the plungers 34 are forceably urged. For example, if the initial compression modulus of the finished egg carton 40 is 2000 p.s.i. and it is desired to reduce this compression modulus to 500 p.s.i. the plungers 34 are advanced at a rate of 0.05 inch per minute. This rate of advancement of the plungers 34 would reduce the compression modulus to 500 p.s.i. at the areas of the egg carton 40 contacted by the plungers 34 in the manner graphically illustrated by the broken line 12 of FIGURE 4.

During the advancement of the plungers 34 an area of a bottom wall 41 in each of a pair of identical egg-receiving cells 42 of the finished polystyrene egg carton 40 are subjected to a compressive force in excess of the particular compressive strength of the egg carton 40. The reduction in the compression modulus of these selected areas renders the same more resilient, softer, and thereby enhances the shock-absorbing or cushioning capacity of the egg-receiving cells 42. It should also be noted that the advancement of the plungers 34 shift the radial apertures 36 and 37 out of alignment to prevent steam from entering the interior of each of the hollow plungers 34. In this manner, the egg carton 40 is "cold-worked." That is, only the compressive force exerted by the plungers 34 mechanically softens the egg carton 40 and the only temperature affect is that produced by internal frictional heat generated in the foam by the comcompression thereof. This "cold-working" may also be performed by first circulating a suitable fluid coolant through the male mold section 21 prior to reciprocating the plungers 34.

At the end of the advancement of the reciprocal plungers 34, the mold sections 21 and 22 are retracted in the direction of the arrows of FIGURE 2 to open the steam-chest mold 20. Although the bottom walls 41 of the egg-receiving cells 42 were compressed during the advancement of the plungers 34, it should be particularly noted that these bottom walls 41 are in no way permanently deformed at the end of the compression cycle. Rather, the bottom walls 41 rebound to the initial shape illustrated in FIGURE 1.

Thereafter, the completed egg carton 40 may be withdrawn from the mold cavity 25 and the cycle repeated to produce similar egg cartons having selective areas of relatively low compression moduli as compared to the egg cartons as a whole, thereby achieving areas of high cushioning and shock-aborbing capacities.

It is not necessary to "cold-work" a molded plastic container while the same is still in a mold to achieve resilient areas of low compression modulus of the type heretofore described. Rather, a foam plastic container such as an egg carton may be cold-worked by applying compressive forces against the egg carton after the same has been withdrawn from an associated mold cavity.

Figure 3:
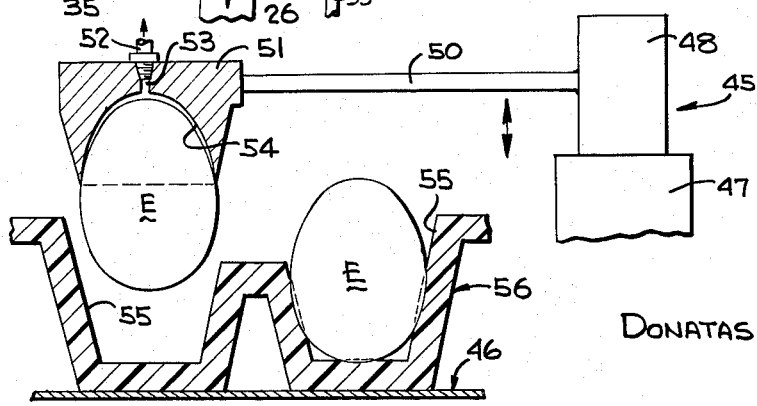

FIGURE 3 of the drawings illustrates the cold-working of a foam plastic container, such as an egg carton formed from expandable polystyrene foam, after the egg carton has been widthdrawn from a mold. A reciprocating apparatus 45 is suitably supported adjacent an upper run 46 of a conveyor belt (not shown). The mechanism 45 includes a fluid cylinder 47 which reciprocates a piston thereof in a known manner. An arm 50 is secured to the piston 48 at one end portion thereof and carries a vacuum cup 51 at an end of the arm remote from the piston 48. The vacuum cup 51 is provided with a fitting 52 in fluid communication with an evacuating source (not shown) such as a vacuum pump. The fitting 52 opens through a port 53 into a downwardly opening concave cavity 54 of the vacuum cup 51. The arm 50 is reciprocated in synchronism with the mechanism 47 and descends each time an egg-receiving cell 55 of an egg carton 56 is in underlying relationship to the vacuum cup 51. As the arm 50 reciprocates downwardly as viewed in FIGURE 3 of the drawing at a particular rate, an egg E carried by the vacuum cup 51 is forced against a plurality of areas in each of the egg-receiving cells 55. As the egg E is thus forced against the foam plastic material of the egg carton 56, the polystyrene material is softened as the compression modulus thereof is reduced by the compressive force of the egg E "cold-working" the egg carton 56 in the manner heretofore discussed in connection with FIGURES 1, 2, 4 and 5 of the drawings. It should be particularly noted that a single advancement of the arm 50 urging the egg E into an egg cell 55 of the carton 56 is all that is required to reduce the compression modulus of the egg carton 56, as is graphically illustrated in the graph of FIGURE 4.

The egg E is thus simultaneously packaged in the egg carton 56 and "cold-works" the egg carton 56 to increase the cushioning or shock-absorbing capacity of selective areas contacted by the eggs during the insertion thereof under force into the egg carton 56.

It will be readily apparent that novel and advantageous provisions have been made for carrying out the desired end. However, attention is directed to the fact that variations may be made in the example apparatus, methods and container constructions disclosed herein without departing from the spirit and scope of this invention as defined in the appended claims.

I claim:

1. In an article receiving container having at least a single article receiving cell defined by inner and outer surfaces, the improvement comprising a shock-absorbing portion integrally formed from the inner surface material of said cell, and the material of said shock-absorbing portion having a compression modulus substantially less than the compression modulus of other portions of the inner surface material of said cell.

2. In an article receiving container of the type defined in claim 1 wherein said material is foam plastic polystyrene.

3. In an article receiving container of the type defined in claim 1 wherein said container includes a plurality of additional article receiving cells identical to said first-mentioned single article receiving cell whereby an individual article is adapted to be received in each of said cells.

4. In an article receiving container having at least a single article receiving cell constructed of foam plastic material and including a bottom wall portion and a side wall portion, said bottom and side wall portions being defined by inner and outer surfaces, the improvement comprising a shock absorbing portion integrally formed from the inner surface material of said bottom wall portion, and the material of said shock-absorbing portion having a compression modulus substantially less than the compression modulus of other portions of the inner surface material of the cell.

5. In an article receiving container of the type defined in claim 4 wherein said side wall portion further includes a shock-absorbing portion integrally formed from the material thereof, and said side wall portion has a compression modulus substantially equal to the compression modulus of said bottom wall shock-absorbing portion of the cell.

6. A shock absorbing container comprising at least a single integral one-piece article-receiving compartment, said article receiving compartment being formed of a foam plastic material having a particular compression modulus, and an area of said compartment having a compression modulus at least fifty percent less than the particular compression modulus of said compartment.

7. The shock absorbing container as defined in claim 6 wherein the compression modulus of the compartment area is less than two thousand p.s.i.

References Cited by the Examiner

UNITED STATES PATENTS

| 1,601,547 | 9/1926 | Wofford | 229—14 |
|---|---|---|---|
| 1,783,397 | 12/1930 | Troyk | 229—29 |
| 1,983,322 | 12/1934 | Stewart | 206—65 |
| 2,722,719 | 11/1955 | Altstadter. | |
| 2,737,503 | 3/1956 | Sprague et al. | |
| 3,015,851 | 1/1962 | Wiles | 264—53 |
| 3,042,972 | 7/1962 | Lafferty | 264—53 |
| 3,088,644 | 5/1963 | Mosse | 229—2.5 |
| 3,093,286 | 6/1963 | Brickner et al. | 229—2.5 |
| 3,118,176 | 1/1964 | Freedman et al. | 18—30 X |
| 3,125,780 | 3/1964 | Harrison et al. | 18—30 X |

JOSEPH R. LECLAIR, *Primary Examiner.*

GEORGE O. RALSTON, *Examiner.*

J. F. McNULTY, *Assistant Examiner.*